United States Patent

Burdick

[15] 3,689,879

[45] Sept. 5, 1972

[54] CONSERVATION OF TRANSIENT PULSES IN ANALOG TO DIGITAL CONVERSION

[72] Inventor: Thomas H. Burdick, Deerfield, Ill.

[73] Assignee: Baxter Laboratories, Inc., Morton Grove, Ill.

[22] Filed: May 18, 1971

[21] Appl. No.: 144,456

[52] U.S. Cl. ...........340/347 AD, 179/2 DP, 328/139

[51] Int. Cl. ...........H03k 13/02

[58] Field of Search....340/347 CC, 347 AD; 328/63, 328/72, 139; 178/007.3 S, 69.5 R, 69.5 TV; 179/15 BY, 2 DP, 1 R

[56] References Cited

UNITED STATES PATENTS

| | | | |
|---|---|---|---|
| 3,626,306 | 12/1971 | Puckette | 340/347 AD |
| 3,434,151 | 3/1969 | Bader | 179/2. R |
| 3,611,161 | 10/1971 | Claxton | 328/139 |
| 3,567,857 | 3/1971 | Lynn | 178/007.3 S |
| 3,586,781 | 6/1971 | Jones | 179/15 BY |

*Primary Examiner*—Thomas A. Robinson
*Assistant Examiner*—Jeremiah Glassman
*Attorney*—Griffin, Branigan & Kindness and Samuel B. Smith, Jr.

[57] ABSTRACT

A composite signal comprising an analog signal with transient pulses superimposed thereon is periodically sampled and each sample is converted to a digital value which is stored in a buffer register prior to transfer to a data processing unit. A special circuit comprising a differentiator and comparator continuously receives the composite signal, detects the transient pulses, and forces a value into the buffer register to represent each transient pulse, even though the pulse may occur during an interval when the composite signal is not being sampled by the normal analog to digital conversion circuit. The special circuit may include a counter which is preset to a value N so that the value representing a transient pulse may be forced into the buffer register during N successive cycles. This permits control of the width of the transient pulses when the digital data is reconverted to analog form.

10 Claims, 2 Drawing Figures

INVENTOR
THOMAS H. BURDICK

BY Griffin, Branigan & Kindness
ATTORNEYS

CONSERVATION OF TRANSIENT PULSES IN ANALOG TO DIGITAL CONVERSION

BACKGROUND OF THE INVENTION

In recent years digital data processing systems have been used extensively in medical diagnostics and analysis. For example, one system proposes converting EKG signals derived from a patient from analog form to digital form, transmitting the digital signals over telephone lines to a distance location, and reconverting the digital signals to analog form so as to reconstruct the EKG signals originally derived from the patient. This system allows the specialist at the distant point to make a diagnosis and recommend treatment to a general practitioner who is attending the patient. In such a system it would aid the specialist in his diagnosis if the reconstructed EKG signals contained all of the heart stimulator or pacemaker pulses applied to the patient's heart and present in the EKG signals before they were converted to digital form.

However, in conventional analog to digital converters, the incoming analog signal is sampled at periodic intervals and the magnitude of the signal at the time of sampling is converted to a multi-bit digital value. The actual sampling time is usually quite small compared to the time which lapses between sampling times. Therefore, if transient pulses such as heart stimulator, pacemaker, or synchronizing pulses are superimposed on the incoming analog signal, these pulses will be lost if they occur during the intervals between samples. Thus, in the system described above, the specialist does not gain the benefit of all the data derived from the patient because some of the stimulator or pacemaker pulses are lost during conversion of the data from analog to digital form.

Loss of the transient pulses could be avoided by increasing the sampling rate so that the time between samples is less than the duration of any expected transient pulse. However, in many cases this would be extremely expensive since the circuit components would have to be designed to handle the increased rate of data output.

SUMMARY OF THE INVENTION

An object of this invention is to provide simple and inexpensive means for converting an analog signal and all transient pulses associated therewith or superimposed thereon to digital values.

An object of this invention is to provide means operative in association with an analog to digital converter for developing digital values representing an analog signal and transient pulses associated therewith, even though said pulses may occur during intervals when the analog signal is not being sampled for conversion.

An object of this invention is to provide an analog to digital conversion system for producing a sequence of digital signals representing an analog signal and transient pulses associated therewith, said system comprising: first means for periodically sampling said analog signal; an analog to digital converter responsive to said sampling means for producing digital signals representing the magnitude of the sampled analog signal; register means for storing said digital signal; and, means responsive to said transient pulses for entering a predetermined combination of signals into said register means.

A further object of the invention is to provide means for sampling a composite signal comprising an analog signal having transient pulses superimposed thereon, means for converting the sampled signal to a digital value, differentiator means continuously responsive to said composite signal, comparator means for determining if the output of the differentiator exceeds a preselected value, and means responsive to the comparator means for generating a digital value representing a transient pulse. The device may be provided with a buffer register for storing either the digital value from the converting means or the digital value representing a transient pulse.

The means responsive to the comparator means may include a counter which is present to a predetermined value N by each output pulse from the comparator. The counter is decremented by one during each sample cycle. The output from the counter is then used on N successive sample cycles after a transient pulse is sensed to set into the buffer register a fixed value representing a transient pulse. Thus, by varying the value N one can vary the digital output of the invention so that upon subsequent conversion of the digital values to an analog form the width of the transient pulses may be varied.

Other objects of the invention and its mode of operation will become apparent upon consideration of the following description and the accompanying drawings.

DETAILED DESCRIPTION

Figure 1:
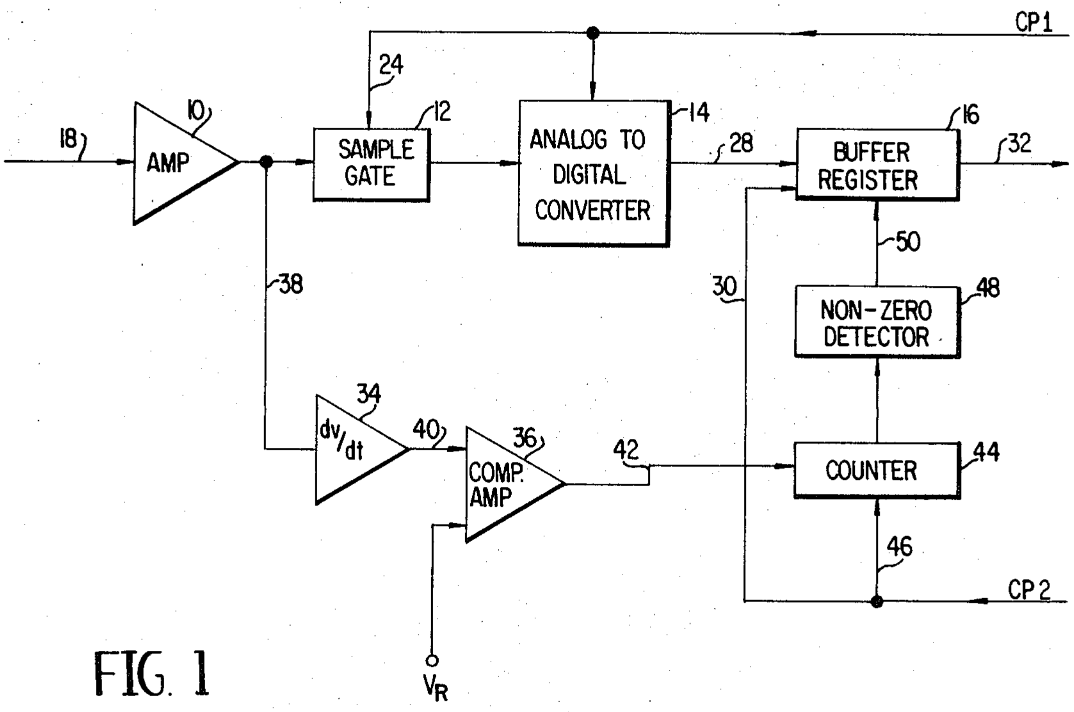
FIG. 1 is a block diagram of an analog to digital conversion system constructed in accordance with the principles of the invention; and, FIG. 2 shows a composite wave form comprising an analog signal having a transient pulse superimposed thereon, and further shows timing pulses utilized in the circuit of FIG. 1.
Figure 2:
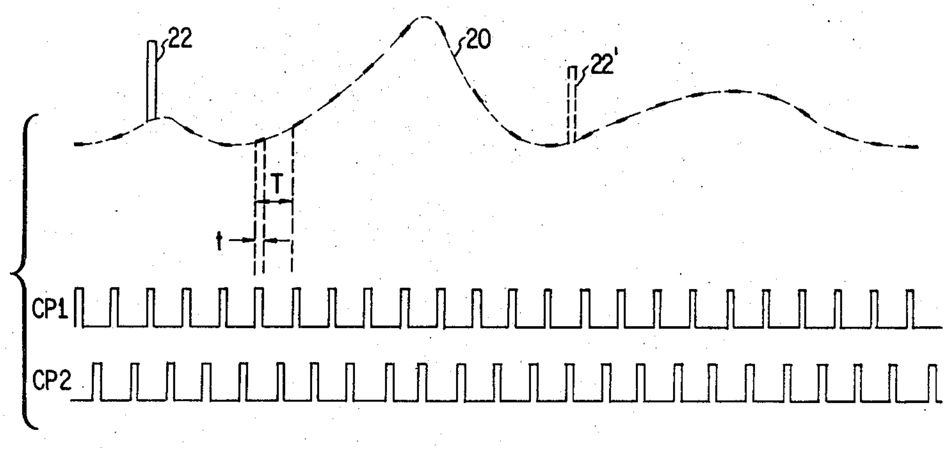

FIG. 1 illustrates a preferred embodiment of the invention including an input amplifier 10, a sample gate 12, an analog to digital converter 14, and a buffer or storage register 16. A composite signal such as that shown in FIG. 2 is derived from a source (not shown) and applied over a lead 18 to the input amplifier 10. The composite signal may comprise an analog signal 20 having one or more transient pulses 22 superimposed thereon. As will be obvious from the subsequent description, the analog signal may represent any signal, such as an EKG signal, and the transient pulses may be any pulses such as pacemaker or synchronizing pulses which are distinguishable from the analog signal on the basis of rate of change in magnitude.

The output of amplifier 10 is applied to one input of the sample gate 12. The sample gate 12 has a second or enabling input lead 24 which receives gating pulses CP1 from a timing pulse generator or data processing unit (not shown). The timing pulses CP1 occur cyclically at a frequency 1/T and each pulse has a duration of *t* as shown in FIG. 2.

Each time the sample gate 12 is conditioned by a pulse on lead 24, it gates the output of amplifier 10 onto a lead 26 so that it is applied to the input of the analog to digital converter 14. The converter is also enabled by each of the timing pulses CP1. Therefore, during each sampling interval *t* the converter produces a multi-bit digital value equal to the analog value of the composite signal during the sampling interval. Each of these digital values is applied over a lead 28 to the buffer register 16 where it is temporarily stored. The buffer register also receives timing pulses CP2 over a lead 30. Each timing pulse applied to the buffer register over lead 30 reads out the digital value in the buffer register and then resets the register. The digital value read out of the buffer register is applied over lead 32 to a data processing unit.

It will be recognized that the sample gate 12, the analog to digital converter 14, and the buffer register 16 comprise a conventional analog to digital converter system. The converter 14 might take any one of several forms now known in the art. Its output may be in serial or parallel form and in any desired digital code. For purposes of the present description it is assumed that each output from the converter 14 is an 8 bit binary value in parallel format. Therefore, the buffer register 16 comprises means for storing in parallel format 8 binary bits of information. Furthermore, the reference numerals 28 and 32 designate transfer buses each containing eight leads.

Referring now to FIG. 2, it will be understood from the foregoing description that the segments of wave form 20 represented by the heavier line segments correspond to the portions of the wave form which are sampled during the occurrence of each CP1 pulse. Each sample is converted to an 8 bit digital value representing the magnitude of the wave form 20 during the sampling interval and this digital value is entered into the buffer register. Subsequently, at time CP2 a pulse on lead 30 gates the digital value out of the buffer register and clears the register so that it is ready to receive another digital value upon occurrence of the next CP1 pulse.

The conventional analog to digital conversion system described above functions quite well to convert the analog signal 20 to a sequence of digital numbers which, after being processed in digital form, may be reconverted to analog form thereby reconstructing the original analog signal. The conventional analog to digital converter system will also convert a transient pulse superimposed upon the analog signal 20 to a digital value provided the transient pulse occurs during a time interval that overlaps the occurrence of a CP1 timing pulse. However, if a transient pulse, such as pulse 22' occurs during an interval which does not overlap the occurrence of a CP1 timing pulse, then no digital value is generated to represent the transient pulse. This, when the composite wave form is reconstructed after being processed in digital form, it would carry no indication of the occurrence of the transient pulse 22'. If the transient pulses are pacemaker pulses this would lead one observing the reconstructed composite signal to believe that the pacemaker is not functioning properly. On the other hand, if the transient pulses represent synchronizing pulses then synchronism of the reconstructed wave form might be lost.

To overcome this deficiency, the present invention provides means for detecting every transient pulse no matter when it occurs, and forcing a predetermined value representing the transient pulse into the buffer register each time a transient pulse occurs. The means for detecting the transient pulses comprises a differentiator circuit 34 and an amplitude discriminator means 36. The amplitude descriminator may, for example, comprise a Schmitt trigger or comparator amplifier having one input tied to a reference voltage $V_R$. The output of amplifier 10 is connected by way of a lead 38 to the input of the differentiator circuit and the output of the differentiator circuit is connected by way of a lead 40 to the second input of the amplitude descriminator means.

The output of the amplitude descriminator means is connected by way of a lead 42 to a counter 44 such that each pulse appearing on lead 42 sets the counter 44 to a first predetermined count N. The counter 44 also receives CP2 timing pulses over an input lead 46 and each pulse on lead 46 reduces the count in counter 44 by one. The outputs from the various stages of counter 44 are connected to a detecting circuit 48 which produces an output signal on a lead 50 as long as the counter 44 does not contain a second predetermined value. In order to simplify the present description this second predetermined value is assumed to be 0. The output lead 50 from the detector means 48 is connected to each stage of the buffer register 16 so as to force into the buffer register the maximum value it is capable of storing, i.e., 11111111 if the register contains eight stages.

Operation of the transient pulse detection circuit is based on the fact that the maximum rate of change in the magnitude of the analog signal 20 is considerably less than the maximum rate of change in the magnitude of the transient pulses 22. For example, the rise time of pacemaker pulses is typically 10 times faster than the maximum rise time of EKG signals.

The composite signal appearing at the outputs of amplifier 10 is applied over lead 38 to the differentiator circuit 34. As is well known, the differentiator circuit produces an output signal whose magnitude is dependent upon the rate of change in the magnitude of the signal applied to its input. Thus, the voltage appearing on lead 40 as a result of variation in the magnitude of the analog signal 20 will, comparatively speaking, be small compared to the voltage appearing on lead 40 as a result of a transient pulse 22 having been applied to the differentiator circuit. The voltage $V_R$ applied to the comparator amplifier 36 is adjusted such that $V_R$ is greater than any voltage appearing on lead 40 as a result of a change in the magnitude of the analog signal 20, but is smaller than the magnitude of the voltage appearing on lead 40 as a result of a transient pulse having been applied to the differentiator circuit. Therefore, the comparator amplifier 36 produces an output pulse on lead 42 each time a transient pulse is applied to the differentiator circuit.

Each pulse on lead 42 immediately sets a predetermined count, for example a count of 5, into the counter 44. The non-zero detector 48 then immediately senses the non-zero count in counter 44 and produces a signal on lead 50 to set the maximum value into buffer register 16. Therefore, no matter when a transient pulse occurs during a cycle, it immediately causes entry of a maximum value into the buffer register 16.

At this point it might be noted that the buffer register may already be storing a digital value as a result of sampling the analog signal during time CP1. However, this digital value will be less than 11111111, the maximum value that can be stored in the 8-bit buffer register. Therefore, the signal on lead 50 will have the effect of setting to 1 those register stages storing a 0 so that the value already in the register is modified to represent the maximum value. On the other hand, if the transient pulse occurs after CP2 but before the next CP1, the register 16 will be storing binary zeros in all positions and the signal on lead 50 will change each of these zeros to a binary one.

The first CP2 timing pulse, occuring after a transient pulse, is applied over lead 30 to the buffer register so as to read out onto bus 32 the maximum value standing in the buffer register. The pulse on lead 30 also resets the buffer register but since the count in counter 44 is not 0 the signal on lead 50 immediately reenters the maximum value into the buffer register. At the same time, the CP2 timing pulse on lead 46 reduces the count in counter 44 by one.

During the next four succeeding cycles, the CP2 timing pulse is applied over lead 30 to read the maximum value out of the buffer register 16 and reduce the count in counter 44 by a count of 1. The fifth CP2 timing pulse (after the transient pulse) reduces the count in counter 44 to 0 hence the signal on lead 30 resets the buffer register 16 so that it contains the value zero. With the counter containing a count of zero there is no longer a signal on lead 50 to set the maximum value into the buffer register. The transient pulse detecting means and the counter 44 then remain inactive until another transient pulse is applied to the differentiator circuit 34.

As previously mentioned, the digital output from buffer register 16 may be processed in digital form and then reconverted to analog form so as to reconstruct the composite wave form shown in FIG. 2. The purpose of counter 44 is to enable control of the width of the transient pulse (22 or 22') in the reconstructed composite analog signal. If the counter 44 is provided with a selection switch, then an operator may preselect the value N which is entered into the counter in response to each pulse on lead 42. As is evident from the above discussion, this count determines the number of cycles in which the maximum value is entered into the buffer register 16 and thus the number of times this maximum value will be converted to analog form when the composite signal is reconstructed.

Since the value forced into the buffer register 16 as a result of sensing a transient pulse is a maximum value having no relation to the magnitude of the transient pulse itself, it follows that the transient pulse in the reconstructed wave form will have a maximum magnitude which bears no relationship to the magnitude of the original transient pulse.

While a specific preferred embodiment of the invention has been described for purposes of illustration, it will be obvious that various substitutions and modifications therein may be made without departing from the spirit and scope of the invention as defined by the appended claims. For example, it is obvious that present invention is not limited to use in systems wherein the transient pulses are superimposed on the analog signal, but may be used equally well when the transient pulses are generated separately from, but in synchronism with, the analog signal. In this case the analog signal is applied to amplifier 10 but the input of differentiator 34 is connected only to the source of transient pulses. Thus, by an obvious slight modification, the present invention may be used to derive digital values representing an analog signal and transient pulses related thereto, even though the transient pulses are not superimposed thereon.

The embodiments of this invention in which an exclusive property or privilege is claimed are defined as follows:

1. A system for the analog to digital conversion of a composite signal comprising an analog signal having transient pulses superimposed thereon, said system comprising:
- means for periodically sampling said composite signal;
- an analog to digital coversion means responsive to said sampling means for producing a digital value representing the magnitude of the composite signal, said conversion means producing a digital value for each sample;
- storage means for storing each of said digital values;
- means continuously responsive to said composite signal for detecting said transient pulses; and,
- means responsive to said detector means for entering a predetermined digital value into said storage means in response to each transient pulse detected.

2. A system as claimed in claim 1 wherein said means for entering a predetermined digital value includes means for repeatedly entering said predetermined value into said storage means in response to each transient pulse detected.

3. A system as claimed in claim 1 wherein said means for entering a predetermined digital value comprises:
- a counter;
- means responsive to said detection means for entering a predetermined count into said counter in response to each detected pulse;
- means for cyclically clearing said storage means and modifying the count in said counter; and,
- means responsive to said counter for cyclically entering a predetermined digital value into said storage means after it has been reset, if the modified count in said counter is not a second predetermined count.

4. A system as claimed in claim 1 wherein said means for detecting transient pulses comprises differentiator circuit means for providing an output signal whose magnitude is dependent on the rate of change in the magnitude of said composite signal, and amplitude discriminator means responsive to said differentiator circuit output signal for producing an output pulse when the magnitude of said output signal exceeds a selected magnitude.

5. A system as claimed in claim 4 wherein said means for entering a predetermined digital value comprises:
- a counter,
- means connecting said amplitude discriminator means to said counter to enter a predetermined count into said counter in response to each output pulse from said amplitude discriminator means;

means for cyclically clearing said storage means and modifying the count in said counter; and, means responsive to said counter for cyclically entering a predetermined digital value into said storage means after it has been reset, if the modified count in said counter is not a second predetermined count.

6. A system as claimed in claim 5 wherein said composite signal comprises an EKG signal with pacemaker pulses superimposed thereon.

7. An analog to digital conversion system for producing a sequence of digital signals representing an analog signal and transient pulses associated therewith, said system comprising:

first means for periodically sampling said analog signal;

an analog to digital converter responsive to said sampling means for producing digital signals representing the magnitude of the sampled analog signal;

register means for storing said digital signal; and, means responsive to said transient pulses for entering a predetermined combination of signals into said register means.

8. A system as claimed in claim 7 wherein said means for entering signals into said register means comprises means for repeatedly entering the same predetermined combination of signals into said register means in response to each one of said transient pulses.

9. A system as claimed in claim 7 wherein said means responsive to transient pulses comprises:

differentiator circuit means for providing an output signal whose magnitude is dependent on the rate of change in the magnitude of said transient pulses, amplitude discriminator means responsive to said differentiator circuit output signal for producing an output pulse when the magnitude of said output signal exceeds a selected magnitude;

a counter, means connecting said amplitude discriminator means to said counter to enter a predetermined count into said counter in response to each output pulse from said amplitude discriminator means;

means for cyclically clearing said storage means and modifying the count in said counter; and, means responsive to said counter for cyclically entering a predetermined digital value into said storage means after it has been reset, if the modified count in said counter is not a second predetermined count.

10. A system as claimed in claim 9 wherein said transient pulses are superimposed on said analog signal.

* * * * *